United States Patent [19]

Kajihara

[11] 4,388,019
[45] Jun. 14, 1983

[54] ARTIFICIAL REEF ASSEMBLY CONSTRUCTION

[75] Inventor: Kunio Kajihara, Tokyo, Japan

[73] Assignee: Asahi Kasei Kogyo Kabushiki Kaisha, Osaka, Japan

[21] Appl. No.: 254,982

[22] Filed: Apr. 16, 1981

[30] Foreign Application Priority Data

Dec. 8, 1980 [JP] Japan ................................ 55-171983

[51] Int. Cl.³ ............................................. E02B 3/04
[52] U.S. Cl. ......................................... 405/25; 405/32
[58] Field of Search ....................... 405/15, 21, 23, 24, 405/25, 27, 28, 30, 32

[56] References Cited

U.S. PATENT DOCUMENTS

| | | | |
|---|---|---|---|
| 1,635,899 | 7/1927 | Nohlen | 405/28 |
| 1,819,305 | 8/1931 | Snyder | 405/32 |
| 1,888,364 | 11/1932 | Van Orman | 405/32 |

FOREIGN PATENT DOCUMENTS

| | | | |
|---|---|---|---|
| 53-98291 | 8/1978 | Japan . | |
| 2006689 | 5/1979 | United Kingdom | 405/28 |

*Primary Examiner*—David H. Corbin
*Attorney, Agent, or Firm*—Birch, Stewart, Kolasch & Birch

[57] ABSTRACT

An artificial reef assembly construction which comprises an artificial reef assembly comprising a plurality of artificial reef units and a predetermined number of rods each having an engaging means, said rods being disposed on the artificial reef assembly at its both side walls and firmly secured to the reef units of the side walls, is easy and simple to move or transport by hoisting and lowering it by means of the hoisting member of crane or the like through the medium of said engaging means of the rods attached to the artificial reef assembly.

7 Claims, 1 Drawing Figure

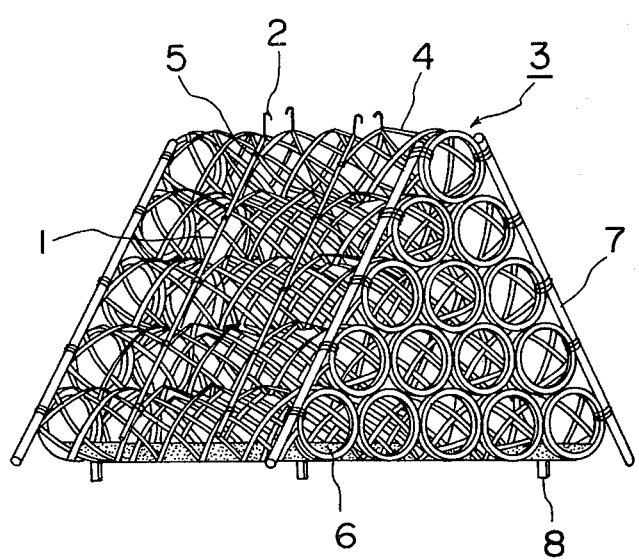

ARTIFICIAL REEF ASSEMBLY CONSTRUCTION

This invention relates to an artificial reef assembly construction which can be easily handled with respect to hoisting and lowering. More particularly, the present invention is concerned with an artificial reef assembly construction comprising an artificial reef assembly and a means securely attached to said artificial reef assembly and adapted to be engaged with a hoisting member of a crane or the like, thereby enabling the artificial reef assembly construction to be easily hoisted and lowered so that the artificial reef assembly construction can be easily moved from the coast onto the sea, or can be easily taken on a crane boat or the like for transportation on the sea and submergence beneath the sea at a predetermined location.

Recently, various investigations have been made with respect to suitable structures of artificial reefs from a viewpoint of ecology of fishes. As a result, it has been proposed to install large quantities of large-size structures having not only a lateral extent and an appropriate height but also an open space therein, and capable of flowing tidal currents therethrough. These structures, however, are difficult to transport on the sea and install in a desired location due to a large size thereof.

Previously, Kikuzawa et al. proposed an artificial reef assembly comprising a plurality of artificial reef units each comprising a hollow cylindrical structure formed by spirally winding elongated fiber glass-reinforced plastics (see Japanese Patent Application Publications Nos. 830-1979, 20433/1979 and 24953/1979). Fiber glass-reinforced plastics are small in specific gravity and can be easily shaped into a desired structure and, hence, they are advantageously employable as materials for producing a light-weight, large-size artificial reef. More specifically, the proposed artificial reef assembly comprises a plurality of artificial reef units each comprising a hollow structure having at one end thereof a first opening and at the other end thereof a second opening and having a peripheral framework extending from the circumference of said first opening to the circumference of said second opening, said peripheral framework comprising a plurality of first fiber-reinforced plastic bands wound spirally about an axis of the hollow structure from said first opening to said second opening at an oblique angle with the axis and a plurality of second fiber-reinforced plastic bands wound spirally about the axis in a direction opposite to said first fiber-reinforced plastic bands, thereby forming lattice pattern windows respectively defined by said first fiber-reinforced plastic bands and said second fiber-reinforced plastic bands intersecting therewith. The cross-sectional shape of the hollow structure may be circular, elliptical, triangular, rectangular, pentagonal, hexagonal, — or polygonal. The circular shape in cross-section is most preferred because the structure having a circular shape in cross-section has the highest resistance to the external force.

Such an artificial reef assembly, in general, is characterized in that due to the material relatively light in weight, it can be stably kept in place on the sea bottom only by attaching a small weight or weights to the base units. Even the above-mentioned artificial reef assembly, however, according to such a recent tendency that a large-sized assembly is demanded, is often composed of relatively many cylindrical artificial reef units each having a large diameter and a large length, leading to increase in weight, sometimes amounting to several tons to several dozens of tons. Such a large-size heavy artificial reef assembly encounters difficulties in moving or transporting.

To build up and transport a large-sized artificial reef assembly as mentioned above, there has conventionally been employed a method in which a plurality of artificial reef units are piled and held together on a plurality of first H beams or logs previously arranged to build up an artificial reef assembly thereon. Second H beams or logs for transportation are then inserted under the reef assembly in such a manner that they are located between the first H beams or logs, and the second H beams or logs are connected, at their respective ends, to a crane or the like by means of a rope so that the artificial reef assembly can be hoisted and horizontally or rotatably moved by the crane or the like through the second H beams or logs. In practicing the above-mentioned method, however, a difficulty is encountered in obtaining second or transporting H beams or logs such as capable of standing the heavy load of the large-sized artificial reef assembly. Illustratively stated, the larger the artificial reef assembly, the greater is the span of each of the transporting H beams or logs, causing the transporting H beams or logs to be heavily loaded. H beams or logs generally available are unable to stand such a heavy load. Accordingly, the use of H beams or logs of extremely high strength is necessary for suspending such a large-sized artificial reef assembly. These H beams or logs of extremely high strength, however, are not only costly to obtain but are also awkward to transport because of their considerably large weight.

With a view to developing a new technique for easy movement or transportation of an artificial reef assembly, the present inventor has made extensive and intensive studies. As a result, it has been found that an artificial reef assembly construction comprising the above-mentioned artificial reef assembly comprising artificial reef units each comprising the above-defined hollow structure and a predetermined number of hook-including rods is extremely easy to move or transport. The present invention has been made, based on such a novel finding.

It is therefore an object of the present invention to provide an artificial reef assembly construction which can be easily handled with respect to hoisting and lowering and therefore, can be easily transported to and unloaded at a predetermined location of the marine environment.

The foregoing and other objects, features and advantages will be apparent to those skilled in the art from the following detailed description taken in connection with the accompanying drawing in which:

FIGURE is a perspective view of one form of an artificial reef assembly construction of the present invention.

In accordance with the present invention, there is provided an artificial reef assembly construction which comprises an artificial reef assembly comprising a plurality of artificial reef units each comprising a hollow structure having at one end thereof a first opening and at the other end thereof a second opening and having a peripheral framework extending from the circumference of said first opening to the circumference of said second opening, said peripheral framework comprising a plurality of first fiber-reinforced plastic bands wound spirally about an axis of the hollow structure from said first opening to said second opening at an oblique angle with the axis and a plurality of second fiber-reinforced plastic bands wound spirally about the axis in a direction opposite to said first fiber-reinforced plastic bands, thereby forming lattice pattern windows respectively defined by said first fiber-reinforced plastic bands and said second fiber-reinforced plastic bands intersecting therewith;

a weight securely attached to the artificial reef assembly at its lower portion; and a predetermined number of rods each including an engaging means;

said rods each including an engaging means being disposed on the artificial reef assembly at its both side walls in a direction perpendicular to the axis of the artificial reef unit and firmly secured to the reef units of which the outer partial peripheries constitute said side walls by winding, around portions of the rods and the artificial reef units in contact with each other, fiber glass rovings impregnated with a thermohardening resin, followed by curing of the resin.

In making the artificial reef assembly construction of the present invention, artificial reef units, preferably at least three artificial reef units, may be piled up into the form of, e.g., a triangle, rectangle or trapezoid in cross-section, or crosswise in two parallels. Then, the adjacent reef units are tied together with fiber glass rovings impregnated with a thermohardening resin, followed by curing of the resin to form an artificial reef assembly.

The number of rods each including a hook or loop as the engaging means is not critical but is preferably at least 2, more preferably 4 as will be explained later. The rods may usually be disposed, in the form of a pair, on both side walls of the artificial reef assembly in symmetrical relationship. When two pairs of rods are employed, the pairs of rods may preferably be arranged, with an appropriate spacing therebetween, in parallel to each other as will be explained later.

Usually, the reef units of hollow structure located at the lowest position of the artificial reef assembly have, at their respective inner faces or outer faces or at respective both faces thereof, a concrete (preferably a reinforced concrete) as a weight fixedly adhered thereto so that the artificial reef assembly can stand strong tidal currents and strong forces of waves after submerged beneath the sea.

Referring now to FIGURE, there is shown a perspective view of one form of an artificial reef assembly construction of the present invention. An artificial reef assembly 3 consists of fifteen cylindrical reef units 4 stacked in a three square configuration has four rods 1 each having at the upper end thereof, a hook 2, securely attached to the reef units 4 as depicted. Each of the artificial reef units 4 comprises a hollow structure having at one end thereof a first opening and at the other end thereof a second opening and having a peripheral framework extending from the circumference of said first opening to the circumference of said second opening, said peripheral framework comprising a plurality of first fiber-reinforced plastic bands wound spirally about an axis of the hollow structure from said first opening to said second opening at an oblique angle with the axis and a plurality of second fiber-reinforced plastic bands wound spirally about the axis in a direction opposite to said first fiber-reinforced plastic bands, thereby forming lattice pattern windows respectively defined by said first fiber-reinforced plastic bands and said second fiber-reinforced plastic bands intersecting therewith. The four hook-including rods 1 are securely attached to the reef units 4 located in the side wall portions of the reef assembly 3 by tying the rods and the reef units together, at each contact portion 5, with the same fiber glass reinforced plastics as used for the formation of the reef units 4 of the assembly 3. In the artificial reef assembly 3, adjacent reef units are connected together by means of the same fiber glass reinforced plastics as mentioned above, and the two reef units located at both lateral ends of the arrangement of the lowermost units have concrete 6 therein as a weight so that the artificial reef assembly can stand strong tidal currents and strong forces of waves after submerged beneath the sea. Numeral 7 designates guard rods or pipes which serve to reduce the chance for fishing implements such as a trawlnet to hitch on the artificial reef assembly construction. Numeral 8 designates sliding-preventing stakes which serve to prevent lateral movement of the reef assembly construction on the sea bottom. These sliding-preventing stakes 8 may be firmly disposed in place through the concrete 6 contained in the two reef units at both ends of the row of the base units simultaneously with the hardening of the raw concrete poured in the units.

As mentioned before, the number of rods 1 each including a hook as the engaging member is not critical and should be selected according to the size and weight of the artificial reef assembly construction to be constructed, but in general, as shown in Figure, the use of four hook-including rods is most preferred from a viewpoint of stability of the artificial reef assembly construction at the time when it is hoisted. When a reef assembly construction to be constructed is of a small size, however, the number may be reduced to two or three.

Each hook-including rod 1 should be firmly tied to each of the reef units of the side walls of the artificial reef assembly so that when the reef assembly construction is hoisted by the engagement of the hooks with the hoisting member of a crane or the like, the stress produced by the whole gravity of the reef assembly construction is decentralized. In Figure, each hook-including rod 1 is firmly tied to each of the five reef units of the side wall of the artificial reef assembly, thereby not only greatly reducing the stress on each of the contact points of the rods and the reef units, but also enabling the reef assembly construction to be hoisted by a crane or the like.

In attaching the hook-including rods to the reef assembly, the positions of the hook-including rods should be carefully selected so that, when the reef assembly construction is hoisted through all the hooks it may be stably suspended in a well-balanced state. Taking the above into consideration, as mentioned before, it is most preferred that two pairs of hook-including rods be disposed on the artificial reef assembly at its both side walls in symmetrical relationship and in a direction perpendicular to the axis of the artificial reef unit in such a manner that the rods on each side wall are arranged in parallel with an appropriate spacing therebetween. The hook-including rods advantageously serve also as reinforcements for the entire reef assembly construction, and the arrangement of hook-including rods as mentioned above is also advantageous from the standpoint of reinforcement.

As materials for producing such a rod, there can be mentioned, for example, rigid metals such as iron, and fiber-reinforced plastics. Hook-including rods formed of these materials have a sufficient mechanical strength to hang the reef assembly construction. A rope made of a polyester or nylon is also employable.

One advantage of the present invention is that since the reef unit of the artificial reef assembly is made of fiber glass-reinforced plastics, quick and easy, firm attaching of the hook-including rods to the reef units can be attained by winding fiber glass rovings impregnated with a thermohardening resin around the rods and reef units their contact portions. Further, such attaching of the rods to the reef units can be easily effected at any time after production of the reef units, when the artificial reef assembly is desired to move or transport. There is another advantage obtained in connection with the bonding of the rods to the reef units by means of fiber glass rovings impregnated with a thermohardening resin, that is, since the thus formed bonding of fiber glass-reinforced plastics can retain a great bonding strength and is incorrigible in the aquatic environment, the reef assembly construction which has once been placed on the sea bottom may easily be fished or transported according to need to another location of the marine environment by a crane through the hooks at the top of the construction.

As the thermohardening resin for attaching the rods to the reef units, there may be used an unsaturated polyester resin, an epoxy resin, a vinyl ester resin, a phenolic resin and the like. It is preferred to employ an unsaturated polyester resin such as POLYMAL 8238 AP (trade name of a product manufactured and sold by Takeda Chemical Industry Co., Ltd. Japan) because such a resin is economic, excellent in characteristics of shaping together with fibers, workability and handling and durable in the marine environment without undergoing deterioration of strength. It is preferred that the fiber glass rovings for attaching the rods to the reef units be impregnated with the same hardening resin as that employed in the production of the reef units.

In Figure of the accompanying drawing, there are shown hooks each provided at the top of the rod, but this does not mean that only hooks are exclusively employable in the present invention. A loop or any other device may be employed in the present invention, provided that it serves as the engaging means to be engaged with the hoisting member of a crane or the like so that the artificial reef assembly construction may be effectively hoisted therethrough. Similarly, the hook or loop needs not necessarily be located at the top of the rod and may be attached, for example, to the middle portion of the rod.

Thus, the present invention clearly provides a marked improvement over prior art artificial reefs. The artificial reef assembly construction provided in accordance with the present invention is of a simple structure, can be readily hoisted and lowered by a crane or the like without any fear of damaging the same, and can be easily fished and transported to be disloaded at a different location of the marine environment even after the reef assembly construction has once been placed on the sea bottom. In line with the recent trend toward construction of large-sized artificial reefs, the reef assembly construction of the present invention can be most advantageously utilized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An artificial reef assembly construction which comprises an artificial reef assembly comprising a plurality of artificial reef units each comprising a hollow structure having at one end thereof a first opening and at the other end thereof a second opening and having a peripheral framework extending from the circumference of said first opening to the circumference of said second opening, said peripheral framework comprising a plurality of first fiber-reinforced plastic bands wound spirally about an axis of the hollow structure from said first opening to said second opening at an oblique angle with the axis and a plurality of second fiber-reinforced plastic bands wound spirally about the axis in a direction opposite to said first fiber-reinforced plastic bands, thereby forming lattice pattern windows respectively defined by said first fiber-reinforced plastic bands and said second fiber-reinforced plastic bands intersecting therewith;
   a weight securely attached to the artificial reef assembly at its lower portion; and
   a predetermined number of rods each including an engaging means;
   said rods each including an engaging means being disposed on the artificial reef assembly at its both side walls in a direction perpendicular to the axis of the artificial reef unit and firmly secured to the reef units of which the outer partial peripheries constitute said side walls by winding, around portions of the rods and the artificial reef units in contact with each other, fiber glass rovings impregnated with a thermohardening resin, followed by curing of the resin.

2. An artificial reef assembly construction according to claim 1, wherein said rods each including an engaging means are two pairs of rods disposed on the artificial reef assembly at its both side walls in symmetrical relationship and in a direction perpendicular to the axis of the artificial reef unit in such a manner that the rods on each side wall are arranged in parallel with an appropriate spacing therebetween.

3. An artificial reef assembly construction according to claim 1, wherein said artificial reef assembly comprises at least three artificial reef units piled up into the form of a triangle, rectangle or trapezoid in cross-section, or crosswise in two parallels.

4. An artificial reef assembly construction according to claim 1, wherein said engaging means comprises a hook or a loop.

5. An artificial reef assembly construction according to claim 1, which further comprises guard rods or pipes secured to each side wall of the artificial reef assembly at its both end edges.

6. An artificial reef assembly construction according to claim 3, wherein said weight is composed of concrete contained in and adhered to at least two reef units disposed at the lowermost portion of the reef assembly.

7. An artificial reef assembly construction according to claim 6, which further comprises sliding-preventing stakes attached to the bottom of the artificial reef assembly by means of the concrete.

* * * * *